(12) United States Patent
Yamamoto

(10) Patent No.: US 8,286,482 B2
(45) Date of Patent: Oct. 16, 2012

(54) PROCESS-LIQUID SUPPLY MECHANISM AND PROCESS-LIQUID SUPPLY METHOD

(75) Inventor: Shu Yamamoto, Koshi (JP)

(73) Assignee: Tokyo Electron Limited, Minato-Ku (JP)

( * ) Notice: Subject to any disclaimer, the term of this patent is extended or adjusted under 35 U.S.C. 154(b) by 485 days.

(21) Appl. No.: 12/593,996

(22) PCT Filed: Sep. 22, 2008

(86) PCT No.: PCT/JP2008/067102
§ 371 (c)(1), (2), (4) Date: Sep. 30, 2009

(87) PCT Pub. No.: WO2009/047974
PCT Pub. Date: Apr. 16, 2009

(65) Prior Publication Data
US 2010/0037963 A1 Feb. 18, 2010

(30) Foreign Application Priority Data
Oct. 11, 2007 (JP) ................................ 2007-265458

(51) Int. Cl.
*G01F 23/00* (2006.01)

(52) U.S. Cl. ............ 73/290 R; 73/323; 73/332; 116/227

(58) Field of Classification Search ................. 73/290 R, 73/304 R, 323; 116/227
See application file for complete search history.

(56) References Cited

U.S. PATENT DOCUMENTS
6,708,702 B2  3/2004  Kamikawa
2007/0125171 A1  6/2007  Tanaka et al.

FOREIGN PATENT DOCUMENTS
| JP | 07-198446 A1 | 8/1995 |
| JP | 2001-168079 A1 | 6/2001 |
| JP | 2005-221414 A1 | 8/2005 |
| JP | 2007-147535 A1 | 6/2007 |

*Primary Examiner* — Hezron E Williams
*Assistant Examiner* — Paul West
(74) *Attorney, Agent, or Firm* — Burr & Brown

(57) ABSTRACT

A process-liquid supply part includes: a supply tank configured to contain a process liquid; a level gauge pipe connected to the supply tank, the level gauge pipe being provided with level sensors for detecting a remaining amount of the process liquid contained in the supply tank; and a measuring part configured to measure a remaining amount of the process liquid based on signals from the level sensors provided on the level gauge pipe. Connected to the supply tank are a process-liquid supply pipe configured to drain the process liquid contained in the supply tank, and a process-liquid return pipe configured to introduce the process liquid drained through the process-liquid supply pipe to the supply tank. A connection pipe, in which an openable and closable valve is provided, disposed between the process-liquid supply pipe or the process-liquid return pipe and the level gauge pipe.

10 Claims, 2 Drawing Sheets

PROCESS-LIQUID SUPPLY MECHANISM AND PROCESS-LIQUID SUPPLY METHOD

CROSS REFERENCE TO RELATED APPLICATIONS

This application is based upon and claims the benefit of priority from the prior Japanese Patent Application No. 2007-265458 filed on Oct. 11, 2007, the entire contents of which are incorporated herein by reference.

BACKGROUND OF THE INVENTION

1. Field Of The Invention

The present invention relates to a process-liquid supply system and a process-liquid supply method, in which a remaining amount of a process liquid in a container tank is measured by a level sensor disposed on a level gauge pipe.

2. Description Of Related Art

A level gauge pipe provided with a level sensor is connected to a container tank, such as a supply tank that contains a process liquid to be supplied to a substrate processing part, and a preparation tank where the process liquid is prepared, such that a remaining amount of the process liquid contained in the container tank can be measured.

The level sensor includes an upper limit sensor that detects whether the process liquid in the container tank exceeds a predetermined upper limit amount, an intermediate sensor that detects whether the process liquid falls within a predetermined normal amount, and a lower limit sensor that detects whether the process liquid falls below a predetermined lower limit amount (see, JP2001-168079A, for example).

When a remaining amount of the process liquid in the container tank is measured, there is a possibility that, depending on a kind of the process liquid, bubbles are generated on a liquid surface of the process liquid in the level gauge pipe, or that air bubbles are generated in the process liquid in the level gauge pipe. Thus, it is necessary to select a type of the level sensor depending on a kind of the process liquid.

When the mere selection of a type of the level sensor is insufficient, two level sensors may be provided. Namely, when bubbles tend to be generated on the liquid surface, the upper limit sensor and the intermediate sensor may be doubly provided. On the other hand, when air bubbles tend to be generated in the process liquid, the lower limit sensor and the intermediate sensor may be doubly provided.

SUMMARY OF THE INVENTION

The present invention has been made in view of the above circumstances. The object of the present invention is to provide a process-liquid supply system and a process-liquid supply method in which a level sensor disposed on a level gauge pipe can precisely detect a remaining amount of a process liquid in a container tank, without being influenced by bubbles generated on a liquid surface of the process liquid and air bubbles generated in the process liquid.

A process-liquid supply mechanism according to the present invention is configured to supply a process liquid used for processing an object to be processed, the process-liquid supply mechanism comprising:
a container tank configured to contain the process liquid;
a level gauge pipe connected to the container tank, the level gauge pipe being provided with a level sensor for detecting a remaining amount of the process liquid contained in the container tank;
a measuring part configured to measure a remaining amount of the process liquid in the container tank, based on a signal from the level sensor of the level gauge pipe;
a drain pipe connected to the container tank, the drain pipe being configured to drain the process liquid contained in the container tank;
an inflow pipe connected to the container tank, the inflow pipe being configured to introduce the process liquid to the container tank; and
a connection pipe disposed between the drain pipe or the inflow pipe and the level gauge pipe, in the connection pipe an openable and closable opening/closing member is provided.

Due to this structure, by opening the opening/closing member provided in the connection pipe, the process liquid in the drain pipe or the inflow pipe can be introduced to the level gauge pipe. Thus, the level sensor provided on the level gauge pipe can precisely detect a remaining amount of the process liquid in the container tank, without being influenced by bubbles generated on a liquid surface of the process liquid and air bubbles generated in the process liquid.

In the process-liquid supply mechanism according to the present invention, it is preferable that
the drain pipe constitutes a process-liquid supply pipe configured to supply a part of the process liquid drained from the container tank to a processing part, and
the inflow pipe constitutes a process-liquid return pipe configured to introduce the process liquid, which has not been supplied to the processing part, and/or the process liquid, which has been used by the processing part, to the container tank.

In such a process-liquid supply mechanism, it is preferable that the connection pipe is disposed between the process-liquid return pipe and the level gauge pipe.

Due to this structure, an influence exerted on a liquid pressure of the process liquid to be supplied to the processing part can be lessened.

In the process-liquid supply mechanism according to the present invention, it is preferable that the connection pipe is connected to a lower end of the level gauge pipe from below.

Due to this structure, in the level gauge pipe, the process liquid in the container tank can be prevented from flowing back. As a result, bubbles and air bubbles generated in the process liquid in the level gauge pipe can be more reliably cleared away.

In the process-liquid supply mechanism according to the present invention, it is preferable that the measuring part does not measure a remaining amount of the process liquid, when the opening/closing member provided in the connection pipe is in an opened state.

Due to this structure, the level sensor can be prevented from erroneously detecting a remaining amount of the process liquid in the container tank.

In the process-liquid supply mechanism according to the present invention, it is preferable that
the level gauge pipe has a measurement inflow pipe configured to introduce the process liquid in the container tank into the level gauge pipe, and a measurement drain pipe configured to drain the process liquid in the level gauge pipe into the container tank, and
an inside diameter of the measurement inflow pipe is smaller than an inside diameter of the measurement drain pipe.

Due to this structure, in the level gauge pipe, the process liquid in the container tank can be prevented from flowing back. As a result, bubbles and air bubbles generated in the process liquid in the level gauge pipe can be more reliably cleared away.

In the process-liquid supply mechanism according to the present invention, it is preferable that the level gauge pipe has a measurement inflow pipe configured to introduce the process liquid in the container tank into the level gauge pipe, and a measurement drain pipe configured to drain the process liquid in the level gauge pipe into the container tank, and in the measurement inflow pipe an opening/closing member is provided.

Due to this structure, in the level gauge pipe, the process liquid in the container tank can be prevented from flowing back. As a result, bubbles and air bubbles generated in the process liquid in the level gauge pipe can be more reliably cleared away.

A process-liquid supply method according to the present invention is for supplying a process liquid used for processing an object to the processed, the process-liquid supply method comprising the steps of:

draining the process liquid contained in a container tank by a drain pipe;

flowing the process liquid into the container tank by an inflow pipe;

detecting a remaining amount of the process liquid in the container tank by a level gauge pipe provided with a level sensor;

measuring a remaining amount of the process liquid based on a signal from the level sensor of the level gauge pipe; and introducing the process liquid in the drain pipe or the inflow pipe into the level gauge pipe, by opening an opening/closing member provided in a connection pipe disposed between the drain pipe or the inflow pipe and the level gauge pipe.

According to such a method, the process liquid in the drain pipe or the inflow pipe can be introduced to the level gauge pipe by means of the step of introducing. Therefore, the level sensor provided on the level gauge pipe can precisely detect a remaining amount of the process liquid in the container tank, without being influenced by bubbles generated on a liquid surface of the process liquid and air bubbles generated in the process liquid.

According to the present invention, the process liquid in the drain pipe or the inflow pipe can be introduced to the level gauge pipe. Therefore, the level sensor provided on the level gauge pipe can precisely detect a remaining amount of the process liquid in the container tank, without being influenced by bubbles generated on a liquid surface of the process liquid and air bubbles generated in the process liquid.

DETAILED DESCRIPTION OF THE INVENTION

Embodiment

Figure 1:
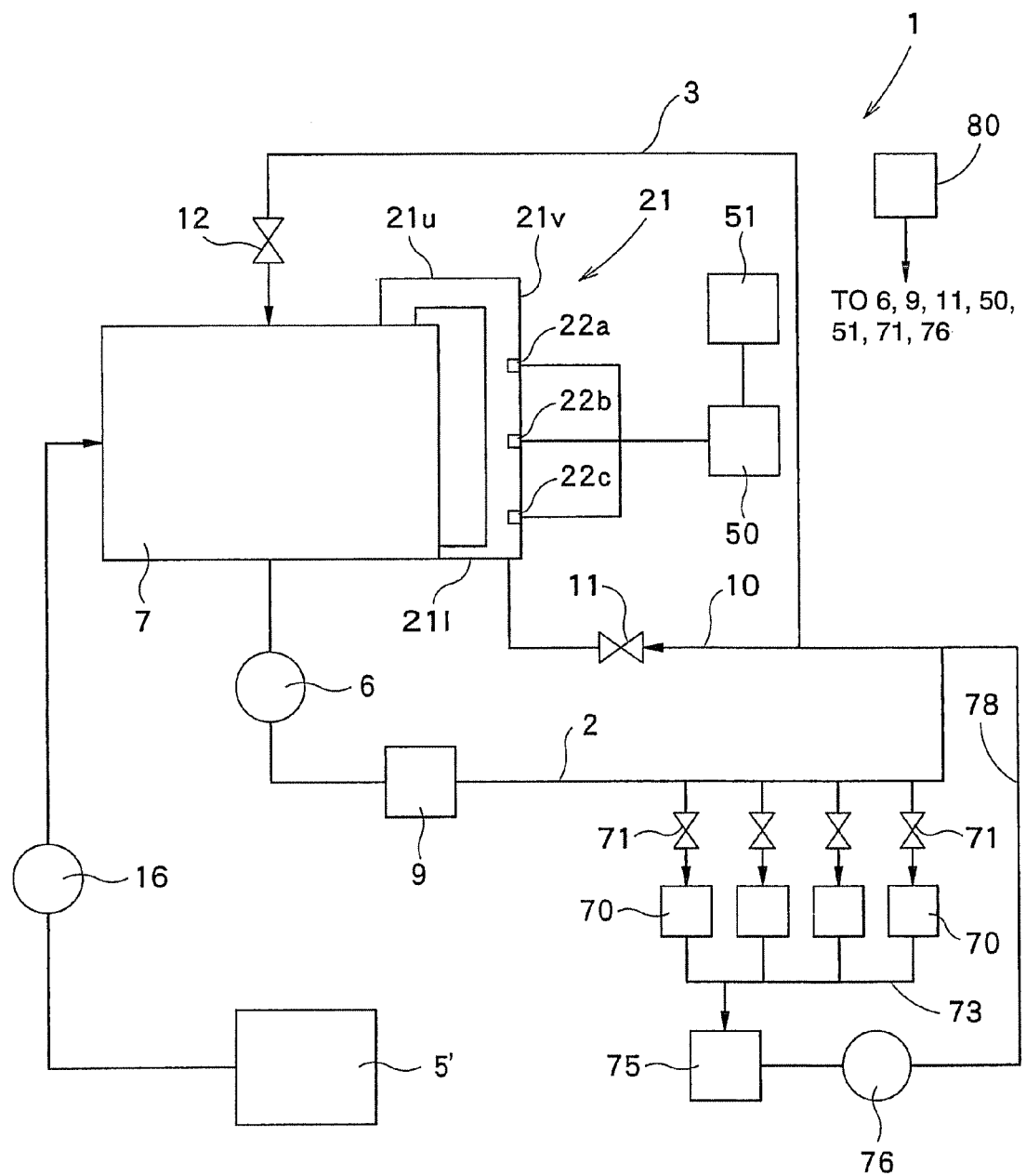
FIG. 1 is a schematic view showing a structure of an embodiment of a process-liquid supply part (process-liquid supply mechanism) according to the present invention.
Figure 2:
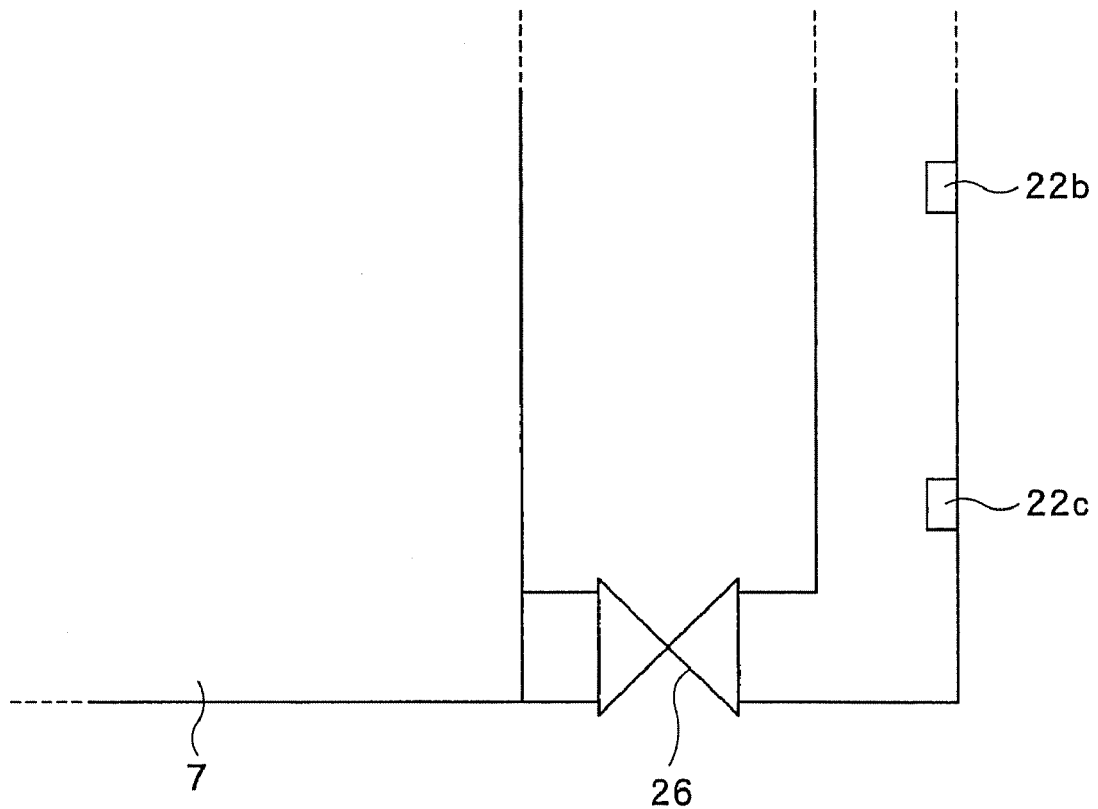
FIG. 2 is a schematic view showing a modification of an embodiment of a process-liquid supply part (process-liquid supply mechanism) according to the present invention.

Herebelow, an embodiment of a process-liquid supply part (process-liquid supply mechanism) 1 according to the present invention is described with reference to the drawings. FIGS. 1 and 2 are views showing the embodiment of the present invention.

As shown in FIG. 1, the process-liquid supply part 1 is adapted to supply a process liquid to a substrate processing part (processing part) 70 that processes an object to be processed such as a semiconductor wafer (hereinafter, referred to simply as "wafer").

As shown in FIG. 1, the process-liquid supply part 1 includes: a supply tank (container tank) 7 configured to contain a process liquid; a level gauge pipe 21 connected to an upper portion and a lower portion of the supply tank 7, the level gauge pipe 21 being provided with level sensors 22a, 22b, and 22c for detecting a remaining amount of the process liquid contained in the supply tank 7; and a measuring part 50 connected to the level sensors 22a, 22b, and 22c provided on the level gauge pipe 21, the measuring part 50 being configured to measure a remaining amount of the process liquid based on signals from the level sensors 22a, 22b, and 22c.

These level sensors 22a, 22b, and 22c include: the upper limit sensor 22a that detects whether the process liquid in the container tank exceeds a predetermined upper limit amount, the intermediate sensor 22b that detects whether the process liquid falls within a predetermined normal amount, and the lower limit sensor 22c that detects whether the process liquid falls below a predetermined lower limit amount. The measuring part 50 is connected to the respective upper limit sensor 22a, the intermediate sensor 22b, and the lower limit sensor 22c.

As shown in FIG. 1, connected to the supply tank 7 is a process-liquid supply pipe (drain pipe) 2 configured to drain the process liquid contained in the supply tank 7, and supply a part of the drained process liquid to the substrate processing part 70. In addition, connected to the supply tank 7 is a process-liquid return pipe (inflow pipe) 3 configured to introduce the process liquid, which has not been supplied to the substrate processing part 70, to the supply tank 7. A connection pipe 10, in which an openable and closable valve (opening/closing member) 11 is provided, is disposed between the process-liquid return pipe 3 and the level gauge pipe 21.

As shown in FIG. 1, the plurality of (four in FIG. 1) substrate processing parts 70 are provided, and openable and closable valves 71 are disposed on upstream sides of the respective substrate processing parts 70. Connected to the respective substrate processing parts 70 is a recovery part 75 configured to recover the process liquid used in the substrate processing parts 70 through a recovery pipe 73. A recovery pipe 78, which introduces the recovered process liquid to the process-liquid return pipe 3, is connected to the recovery part 75. Provided in the recovery pipe 78 is a pump 76 that imparts a driving force to the process liquid that is recovered by the recovery part 75.

As shown in FIG. 1, the level gauge pipe 21 has: a lower horizontal pipe 21*l* (measurement inflow pipe) that is horizontally extended, the lower horizontal pipe 21*l* being configured to introduce the process liquid in the supply tank 7 into the level gauge pipe 21; a vertical pipe 21*v* that is extended upward from the lower horizontal pipe 21*l*; and an upper horizontal pipe 21*u* (measurement drain pipe) that is horizontally extended from the vertical pipe 21*v*, the upper horizontal pipe 21*u* being configured to drain the process liquid in the level gauge pipe 21 into the supply tank 7. The connection pipe 10 is connected to a lower end of the vertical pipe 21*v* of the level gauge pipe 21 from below, whereby the used process liquid flows upward into the vertical pipe 21*v*.

As shown in FIG. 1, a switch mechanism 51 is connected to the measuring part 50. The switch mechanism 51 controls the measuring part 50 such that a remaining amount of the process liquid is not measured when the valve 11 disposed in the connection pipe 10 is in an opened state.

As shown in FIG. 1, an inside diameter of the lower horizontal pipe 21*l* is smaller than inside diameters of the vertical pipe 21v and the upper horizontal pipe 21u. Preferably, the inside diameter of the lower horizontal pipe 21l is about one third of the inside diameters of the vertical pipe 21v and the upper horizontal pipe 21u.

As shown in FIG. 1, an openable and closable valve 12 is disposed in the process-liquid return pipe 3 that introduces the process liquid, which has not been supplied to the substrate processing part 70, and the used process liquid, which has been used by the substrate processing part 70, to the supply tank 7. Further, provided in the process-liquid supply pipe 2 are a pump 6 that imparts a driving force for supplying the process liquid in the supply tank 7 to the substrate processing part 70, and a heater 9 that heats the process liquid.

As shown in FIG. 1, connected to the supply tank 7 is a process-liquid preparation part 5' configured to supply a process liquid which is prepared by mixing water and chemical liquid. When the process liquid in the supply tank 7 falls below a predetermined amount, a process liquid is supplied into the supply tank 7 from the process-liquid preparation part 5' by a driving force of the pump 16.

As shown in FIG. 1, a control part 80, which controls the pump 6, the heater 9, the valve 11, the measuring part 50, the switch mechanism 51, the valve 71, and the pump 76, is connected to these elements.

Next, an operation of the embodiment as structured above is described. The respective pump 6, the heater 9, the valve 11, the measuring part 50, the switch mechanism 51, the valve 71, and the pump 76, are controlled based on signals from the control part 80.

At first, a process liquid in the supply tank 7 is drained by the pump 6 (step of draining). A part of the drained process liquid is sent to the substrate processing part 70. At this time, the process liquid supplied from the supply tank 7 is heated to a suitable temperature by the heater 9.

Then, the process liquid is supplied onto a wafer by the substrate processing part 70, and the wafer is subjected to a cleaning process. The process liquid that has been used for cleaning the wafer is received by the recovery part 75. The used process liquid is introduced into the supply tank 7 through the process-liquid return pipe 3 by a driving force from the pump 76 (see, FIG. 1). The process liquid, which is not supplied to the substrate processing part 70, is directly introduced to the process-liquid supply pipe 3 so as to be introduced into the supply tank 7 (step of inflowing) (see, FIG.

As described above, during when the process liquid is circulated through the supply tank 7 and the substrate processing parts 70, remaining amount of the process liquid contained in the supply tank 7 is detected by the level sensors 22a, 22b, and 22c provided on the level gauge pipe 21 (step of detecting). Based on signals from the level sensors 22a, 22b, and 22c, a remaining amount of the process liquid remaining in the supply tank 7 is measured by the measuring part 50 (step of measuring), and an amount of the process liquid to be contained in the supply tank 7 is adjusted (see, FIG. 1).

Namely, the intermediate sensor 22b detects whether the process liquid falls within a normal amount, the lower limit sensor 22c detects whether the process liquid falls below a predetermined lower limit amount, and the upper limit sensor 22a detects whether the process liquid in the supply tank 7 exceeds a predetermined upper limit amount (see, FIG. 1).

When the intermediate sensor 22b is turned to an off-state, the measuring part 50 judges that the amount of the process liquid in the supply tank 7 is not more than the predetermined normal amount. In this case, a process liquid is introduced from the process-liquid preparation part 5' into the supply tank 7 until the intermediate sensor 22b is turned to an on-state (see, FIG. 1). The lower limit sensor 22c is a sensor for detecting an emergent situation in which the amount of process liquid in the supply tank 7 becomes less than the predetermined lower limit amount, and is generally in an on-state. On the other hand, the upper limit sensor 22a is a sensor for detecting an emergent situation (overflow state) in which the amount of the process liquid in the supply tank 7 becomes more than the predetermined upper limit amount, and is generally in an off-state.

According to this embodiment, as shown in FIG. 1, the connection pipe 10 provided with the openable and closable valve 11 is disposed between the process-liquid return pipe 3 and the level gauge pipe 21. Thus, by opening the valve 11, the used process liquid, which has been used by the substrate processing parts 70, can be periodically introduced into the level gauge pipe 21 from the process-liquid return pipe 3 through the connection pipe 10 (the step of introducing can be carried out).

As a result, bubbles generated on a liquid surface of the process liquid in the level gauge pipe 21 and air bubbles generated in the process liquid in the level gauge pipe 21 can be periodically cleared out. Thus, a remaining amount of the process liquid in the supply tank 7 can be precisely measured by the level sensors 22a, 22b, and 22c provided on the level gauge pipe 21.

Namely, when bubbles are generated on the liquid surface of the process liquid in the level gauge pipe 21, there is a possibility that the upper limit sensor 22 may be turned to an on-state, because of the bubbles generated on the liquid surface of the process liquid, even if the upper surface of the process liquid does not actually reach a height position of the upper limit sensor 22a. In this case, the upper limit sensor 22a may erroneously detect that the upper surface of the process liquid reaches the height position of the upper limit sensor 22a. However, according to this embodiment, such bubbles can be cleared away by the used process liquid inflowing from the connection pipe 10. Namely, it is possible to eliminate the possibility that the upper limit sensor 22a disposed on the level gauge 21 may erroneously detect a remaining amount of the process liquid because of bubbles generated on the liquid surface of the process liquid. Therefore, a remaining amount of the process liquid in the supply tank 7 can be precisely measured.

On the other hand, when air bubbles are generated in the process liquid, there is a possibility that the lower limit sensor 22c may be turned to an off-state, because of the air bubbles generated in the process liquid which touch the lower limit sensor 22c, even if a lower surface of the process liquid is not below a height position of the lower limit sensor 22c. In this case, the lower limit sensor 22c may erroneously detect that the lower surface of the process liquid falls below the height position of the lower limit sensor 22c. However, according to this embodiment, such air bubbles can be cleared away by the used process liquid inflowing from the connection pipe 10. Namely, it is possible to eliminate the possibility that the lower limit sensor 22c provided on the level gauge pipe 21 may erroneously detect a remaining mount of the process liquid because of air bubbles generated in the process liquid. Therefore, a remaining amount of the process liquid in the supply tank 7 can be precisely measured.

In addition, the step of introducing may be performed while the substrate processing parts 70 do not process wafers, or may be periodically performed while the substrate processing parts 70 process wafers. In the latter case, it is not necessary to suspend the process of the wafers by the substrate processing parts 70.

Further, the connection pipe 10 is not connected to the process-liquid supply pipe 2 and the level gauge pipe 21, but is connected to the process-liquid return pipe 3 and the level gauge pipe 21. Thus, an influence exerted on a liquid pressure of the process liquid to be supplied to the substrate processing part 70 can be lessened.

Namely, suppose that the connection pipe 10 is disposed between the process-liquid supply pipe 2 and the level gauge pipe 21. In this case, when the process liquid is introduced into the level gauge pipe 21, a predetermined amount of the process liquid that has been supplied from the supply tank 7 is introduced into the level gauge pipe 21. Thus, a liquid pressure applied to the process liquid is reduced. This may results in reduction in the liquid pressure of the process liquid that is supplied to the substrate processing part 70, whereby a wafer cannot be processed with a high precision.

On the other hand, according to this embodiment, the connection pipe 10 is disposed between the process-liquid return pipe 3 and the level gauge pipe 21. Thus, the used process liquid, which has been used and then recovered, can be introduced to the level gauge pipe 21, whereby an influence exerted on the liquid pressure of the process liquid to be supplied to the substrate processing part 70 can be lessened.

As shown in FIG. 1, the connection pipe 10 is connected to the lower end of the vertical pipe 21v of the level gage pipe 21 from below to the upside. Thus, in the lower horizontal pipe 21l that introduces the process liquid in the supply tank 7 into the level gauge pipe 21, the process liquid can be prevented from flowing back. Since the used process liquid can be reliably introduced from the process-liquid return pipe 3 to the vertical pipe 21v of the level gauge pipe 21, bubbles generated on the liquid surface of the process liquid and air bubbles generated in the process liquid in the level gauge pipe 21 can be more reliably cleared away.

As shown in FIG. 1, the inside diameter of the lower horizontal pipe 21l is smaller than the inside diameters of the vertical pipe 21v and the upper horizontal pipe 21u. Thus, the process liquid can be prevented from flowing back in the lower horizontal pipe 21l that introduces the process liquid in the supply tank 7 into the level gauge pipe 21, whereby the used process liquid can be reliably introduced from the process-liquid return pipe 3 to the vertical pipe 21v of the level gauge pipe 21. As a result, bubbles generated on the liquid surface of the process liquid and air bubbles generated in the process liquid in the level gauge pipe 21 can be more reliably cleared away.

Instead of reducing the inside diameter of the lower horizontal pipe 21l which is shown in FIG. 1, as shown in FIG. 2, it is possible to provide the lower horizontal pipe 21l with an opening/closing member such as a valve 26 and a needle adjusting valve. In this case, when the used process liquid is introduced from the process-liquid return pipe 3 to the level gauge pipe 21, the process liquid in the lower horizontal pipe 21l can be prevented from flowing back, by closing the opening/closing member (valve 26 in FIG. 2).

As shown in FIG. 1, the switch mechanism 51 is connected to the measuring part 50. The control part 50 is controlled by the switch mechanism 51 such that a remaining amount of the process liquid is not measured when the valve 11 disposed on the connection pipe 10 is in an opened state. Thus, it can be prevented that the level sensors 22a, 22b, and 22c erroneously detect a remaining amount of the process liquid in the supply tank 7.

Namely, when the used process liquid is introduced from the process-liquid return pipe 3 to the level gauge pipe 21, the process liquid (including the used process liquid) is circulated through the level gauge pipe 21 and the supply tank 7. Thus, in a case where the measuring part 50 is left to detect signals from the level sensors 22a, 22b, and 22c, there is a possibility that the upper limit sensor 22a may be turned to an on-state, even if the remaining amount of the process liquid in the supply tank 7 does not exceed the predetermined upper limit amount, for example. In this case, the upper limit sensor 22a may erroneously detect a remaining amount of the process liquid remaining in the supply tank 7. However, according to this embodiment, since the measurement part 50 does not receive signals from the level sensors 22a, 22b, and 22c when the valve 11 is in an opened state, the measuring part 50 can be prevented from erroneously detecting a remaining amount of the process liquid in the supply tank 7.

In the above embodiment, the connection pipe 10 is connected to the lower end of the vertical pipe 21v of the level gauge pipe 21. However, not limited thereto, the connection pipe 10 may be connected to an upper part of the level gauge pipe 21.

The invention claimed is:

1. A process-liquid supply mechanism configured to supply a process liquid used for processing an object to be processed, the process-liquid supply mechanism comprising:
   a container tank configured to contain the process liquid;
   a level gauge pipe connected to the container tank, the level gauge pipe being provided with a level sensor for detecting a remaining amount of the process liquid contained in the container tank;
   a measuring part configured to measure a remaining amount of the process liquid in the container tank, based on a signal from the level sensor of the level gauge pipe;
   a drain pipe connected to the container tank, the drain pipe being configured to drain the process liquid contained in the container tank;
   an inflow pipe connected to the container tank, the inflow pipe being configured to introduce the process liquid to the container tank; and
   a connection pipe disposed between the drain pipe or the inflow pipe and the level gauge pipe, in the connection pipe an openable and closable opening/closing member is provided, wherein
   the drain pipe constitutes a process-liquid supply pipe configured to supply a part of the process liquid drained from the container tank to a processing part,
   the inflow pipe constitutes a process-liquid return pipe configured to introduce the process liquid, which has not been supplied to the processing part, and/or the process liquid, which has been used by the processing part, to the container tank, and
   the connection pipe is disposed between the process-liquid return pipe and the level gauge pipe.

2. The process-liquid supply mechanism according to claim 1, wherein
   the connection pipe is connected to a lower end of the level gauge pipe from below.

3. The process-liquid supply mechanism according to claim 1, wherein
   the level gauge pipe has a measurement inflow pipe configured to introduce the process liquid in the container tank into the level gauge pipe, and a measurement drain pipe configured to drain the process liquid in the level gauge pipe into the container tank, and
   in the measurement inflow pipe an opening/closing member is provided.

4. A process-liquid supply mechanism configured to supply a process liquid used for processing an object to be processed, the process-liquid supply mechanism comprising:

a container tank configured to contain the process liquid;
a level gauge pipe connected to the container tank, the level gauge pipe being provided with a level sensor for detecting a remaining amount of the process liquid contained in the container tank;
a measuring part configured to measure a remaining amount of the process liquid in the container tank, based on a signal from the level sensor of the level gauge pipe;
a drain pipe connected to the container tank, the drain pipe being configured to drain the process liquid contained in the container tank;
an inflow pipe connected to the container tank, the inflow pipe being configured to introduce the process liquid to the container tank; and
a connection pipe disposed between the drain pipe or the inflow pipe and the level gauge pipe, in the connection pipe an openable and closable opening/closing member is provided, wherein
the measuring part does not measure a remaining amount of the process liquid, when the opening/closing member provided in the connection pipe is in an opened state.

5. The process-liquid supply mechanism according to claim 4, wherein
the connection pipe is connected to a lower end of the level gauge pipe from below.

6. The process-liquid supply mechanism according to claim 4, wherein
the level gauge pipe has a measurement inflow pipe configured to introduce the process liquid in the container tank into the level gauge pipe, and a measurement drain pipe configured to drain the process liquid in the level gauge pipe into the container tank, and
in the measurement inflow pipe an opening/closing member is provided.

7. A process-liquid supply mechanism configured to supply a process liquid used for processing an object to be processed, the process-liquid supply mechanism comprising:
a container tank configured to contain the process liquid;
a level Gauge pipe connected to the container tank, the level gauge pipe being provided with a level sensor for detecting a remaining amount of the process liquid contained in the container tank;
a measuring part configured to measure a remaining amount of the process liquid in the container tank, based on a signal from the level sensor of the level gauge pipe;
a drain pipe connected to the container tank, the drain pipe being configured to drain the process liquid contained in the container tank;
an inflow pipe connected to the container tank, the inflow pipe being configured to introduce the process liquid to the container tank; and
a connection pipe disposed between the drain pipe or the inflow pipe and the level gauge pipe, in the connection pipe an openable and closable opening/closing member is provided, wherein
the level gauge pipe has a measurement inflow pipe configured to introduce the process liquid in the container tank into the level gauge pipe, and a measurement drain pipe configured to drain the process liquid in the level gauge pipe into the container tank, and
an inside diameter of the measurement inflow pipe is smaller than an inside diameter of the measurement drain pipe.

8. The process-liquid supply mechanism according to claim 7, wherein
the connection pipe is connected to a lower end of the level gauge pipe from below.

9. The process-liquid supply mechanism according to claim 7, wherein
the level gauge pipe has a measurement inflow pipe configured to introduce the process liquid in the container tank into the level gauge pipe, and a measurement drain pipe configured to drain the process liquid in the level gauge pipe into the container tank, and
in the measurement inflow pipe an opening/closing member is provided.

10. A process-liquid supply method for supplying a process liquid used for processing an object to the processed, the process-liquid supply method comprising the steps of:
draining the process liquid contained in a container tank by a drain pipe;
flowing the process liquid into the container tank by an inflow pipe;
detecting a remaining amount of the process liquid in the container tank by a level gauge pipe provided with a level sensor;
measuring a remaining amount of the process liquid based on a signal from the level sensor of the level gauge pipe; and
introducing the process liquid in the drain pipe or the inflow pipe into the level gauge pipe, by opening an opening/closing member provided in a connection pipe disposed between the drain pipe or the inflow pipe and the level gauge pipe,
wherein the step of measuring does not occur when the opening/closing member is in an opened state.

* * * * *